(12) United States Patent
Ide (10) Patent No.: US 8,286,420 B2
(45) Date of Patent: Oct. 16, 2012

(54) DPF ACCUMULATION AMOUNT ESTIMATING APPARATUS

(75) Inventor: Kazunari Ide, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 479 days.

(21) Appl. No.: 12/666,005

(22) PCT Filed: Jan. 28, 2009

(86) PCT No.: PCT/JP2009/051815
§ 371 (c)(1),
(2), (4) Date: Jan. 20, 2010

(87) PCT Pub. No.: WO2009/099077
PCT Pub. Date: Aug. 13, 2009

(65) Prior Publication Data
US 2010/0319319 A1  Dec. 23, 2010

(30) Foreign Application Priority Data

Feb. 8, 2008  (JP) ................................ 2008-029317

(51) Int. Cl.
*F01N 3/00* (2006.01)
(52) U.S. Cl. ................ 60/295; 60/277; 60/286; 60/297; 60/311; 701/103; 701/115; 703/5; 703/8
(58) Field of Classification Search .................... 60/276, 60/277, 285, 286, 295, 297, 311; 701/103, 701/104, 115; 703/5, 8
See application file for complete search history.

(56) References Cited

U.S. PATENT DOCUMENTS 6,820,418 B2 * 11/2004 Nakatani et al. ................ 60/297

(Continued)

FOREIGN PATENT DOCUMENTS

CN  1650095  8/2005

(Continued)

OTHER PUBLICATIONS

International Search Report issued Apr. 28, 2009 in International (PCT) Application No. PCT/JP2009/051815.

(Continued)

*Primary Examiner* — Binh Q Tran
(74) *Attorney, Agent, or Firm* — Wenderoth, Lind & Ponack, L.L.P.

(57) ABSTRACT

A DPF accumulation amount estimating apparatus uses an integrated PM accumulation amount estimation logic which combines the difference between an engine PM emission amount and a PM regeneration amount and a DPF differential pressure model, thereby achieving minimized influences of changes in an exhaust gas flow rate and the like with resultant improved estimation accuracy. The DPF accumulation amount estimating apparatus for estimating the accumulation amount in a DPF (diesel particulate filter) provided therewith for removing PM (particulates (particulate matters)) in an exhaust gas, and includes a PM emission amount model in which a PM emission amount is set on the basis of the operating condition of an engine, a PM regeneration amount model in which a PM regeneration amount is set on the basis of the temperature difference between an outlet temperature and an inlet temperature of the DPF, and a DPF differential pressure model in which a PM accumulation amount is set on the basis of the differential pressure between an exhaust gas flow rate and the DPF, wherein the estimated PM accumulation amount of the DPF is calculated by adding a corrected PM accumulation amount obtained by correcting the estimated value of the DPF differential pressure model by using a coefficient K, which is determined on the basis of an engine speed and the fuel injection amount of an engine, to a difference between a PM emission amount and a PM regeneration amount.

4 Claims, 6 Drawing Sheets

U.S. PATENT DOCUMENTS

| | | |
|---|---|---|
| 6,907,873 B2 | 6/2005 | Hamahata |
| 6,941,750 B2 * | 9/2005 | Boretto et al. ............ 60/297 |
| 7,065,960 B2 * | 6/2006 | Gioannini et al. ......... 60/295 |
| 7,174,706 B2 | 2/2007 | Kuboshima et al. |
| 7,474,953 B2 * | 1/2009 | Hulser et al. ............ 701/108 |
| 7,500,358 B2 * | 3/2009 | Singh et al. ............. 60/295 |
| 2004/0260452 A1 | 12/2004 | Hamahata |
| 2007/0193256 A1 | 8/2007 | Matsuno et al. |

FOREIGN PATENT DOCUMENTS

| | | |
|---|---|---|
| EP | 1 529 929 | 5/2005 |
| JP | 6-341311 | 12/1994 |
| JP | 1 229 223 | 8/2002 |
| JP | 2002-256846 | 9/2002 |
| JP | 2002-303123 | 10/2002 |
| JP | 2003-155921 | 5/2003 |
| JP | 2003-239724 | 8/2003 |
| JP | 2004-76589 | 3/2004 |
| JP | 2004-197722 | 7/2004 |
| JP | 1 529 929 | 5/2005 |
| JP | 2005-256717 | 9/2005 |
| JP | 2005-291169 | 10/2005 |

OTHER PUBLICATIONS

International Preliminary Report on Patentability and Written Opinion of the International Searching Authority mailed Sep. 16, 2010 in International (PCT) Application No. PCT/JP2009/051815.

* cited by examiner

Reset on: x=Estimated amount of DPF differential pressure model

DPF ACCUMULATION AMOUNT ESTIMATING APPARATUS

TECHNICAL FIELD

The present invention relates to a DPF accumulation amount estimating apparatus which estimates an accumulation amount in a DPF. The DPF accumulation amount estimating apparatus is used with a regenerating device of a DPF (diesel particulate filter) of a diesel engine, and provided with a DPF (diesel particulate filter) for removing PM (particulates (particulate matters)) in an exhaust gas, the DPF being installed in an exhaust passage connected to an exhaust port.

BACKGROUND ART

In a diesel engine provided with a DPF (diesel particulate filter) for removing particulates (particulate matters (hereinafter referred to as PM)) in an exhaust gas of the diesel engine, the DPF comes in two types, namely, a metal type and a ceramic type. The metal type is easy to handle, but has a low PM trapping efficiency of 50% to 60%. Meanwhile, the ceramic type has a high trapping efficiency of 90% or more, but tends to allow PM to easily accumulate in the DPF, requiring PM be forcibly burnt.

In the future, a PM regulation value is expected to be stricter, so that the ceramic type with high trapping efficiency is considered to be the mainstream. To regenerate the DPF, it will be essential to accurately estimate a PM accumulation amount on the basis of the operation history of an engine or a condition of the DPF.

Figure 6:
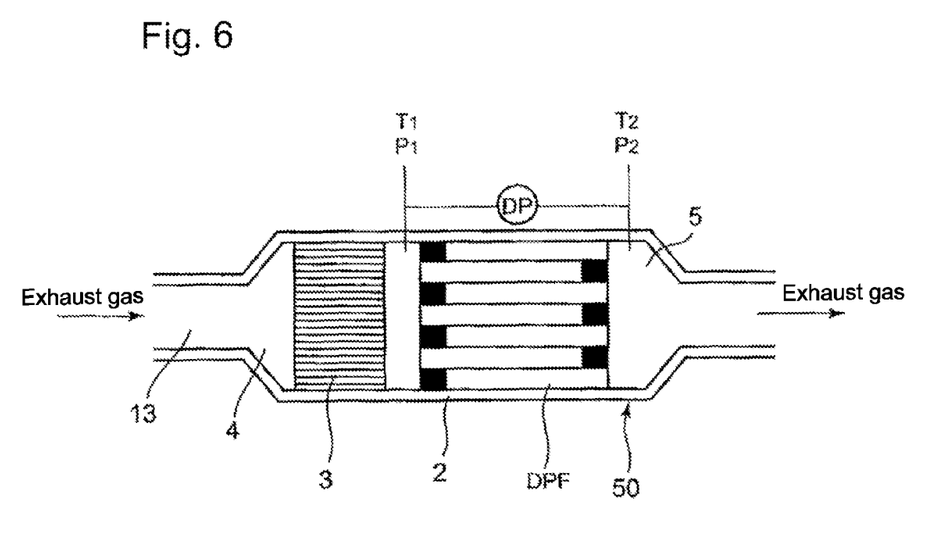
FIG. 6 is a longitudinal sectional diagram illustrating a typical DPF apparatus.

FIG. 6 is a longitudinal sectional diagram of a typical DPF apparatus. In FIG. 6, reference numeral 13 denotes an exhaust pipe in communication with an exhaust port of an engine (not shown), and reference numeral 50 denotes the DPF apparatus connected to the exhaust pipe 13. The DPF apparatus 50 includes a DPF 1 accommodated in a DPF main unit 2 and a pre-stage oxidation catalyst 3 installed on the upstream side of the DPF 1.

The exhaust gas from the engine passes through an inlet chamber 4 from the exhaust pipe 13 and reaches the pre-stage oxidation catalyst 3, and then the exhaust gas is oxidized by the pre-stage oxidation catalyst 3. The oxidative heat generated at that time causes the DPF 1 to rise to 600° C. to 650° C. to burn the PM built up in the DPF 1, and the combustion gas is exhausted to the outside through an outlet chamber 5.

Referring to FIG. 6, P1 denotes an inlet pressure of the DPF 1, T1 denotes an inlet temperature of the DPF 1, P2 denotes an outlet pressure of the DPF 1, and T2 denotes an outlet temperature of the DPF 1.

Figure 7:
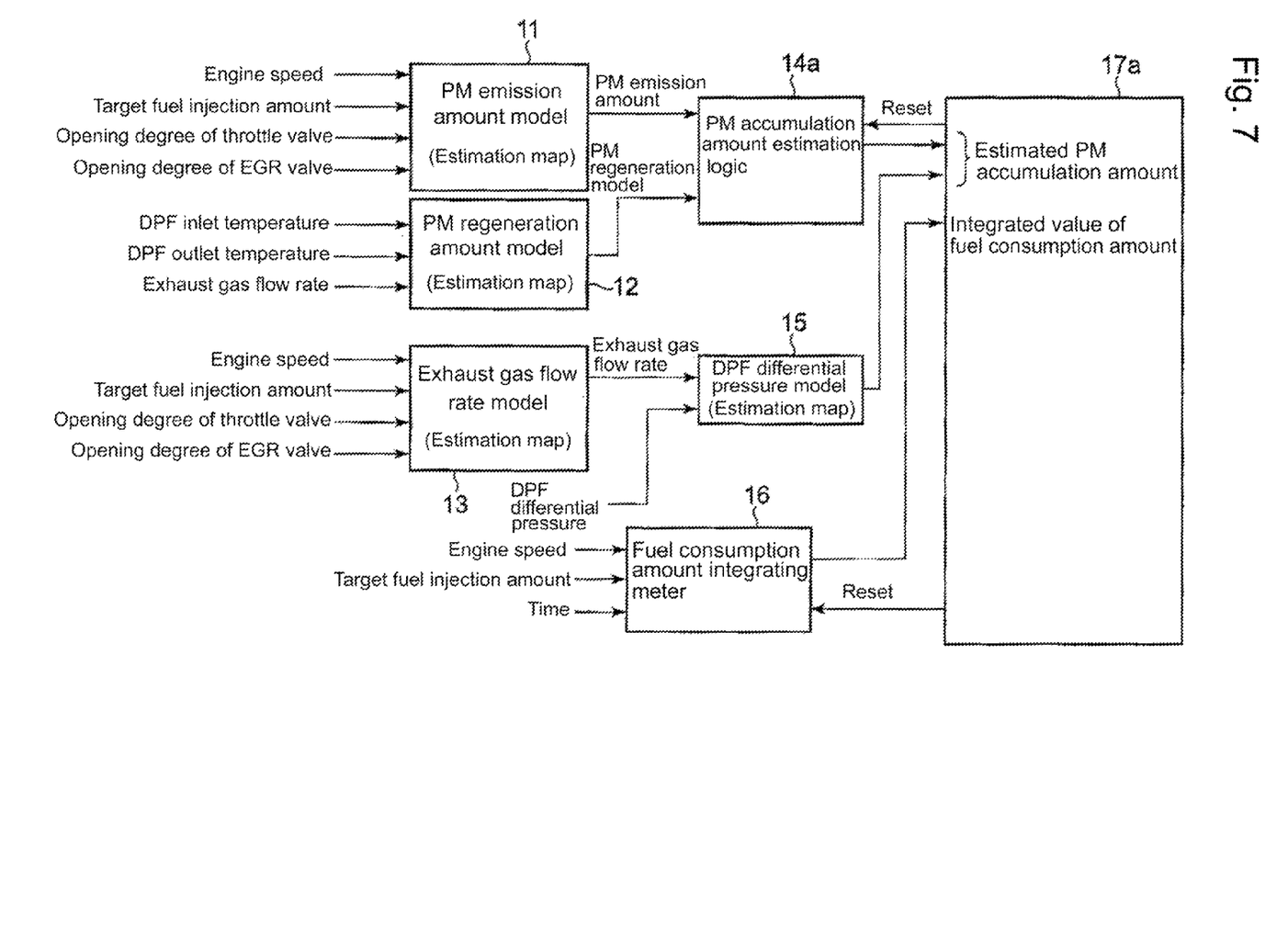
FIG. 7 is a block diagram providing an estimation block diagram of a PM accumulation amount in a regeneration controller of a DPF according to a prior art.

FIG. 7 is a block diagram of the estimation of a PM accumulation amount in a regeneration controller of a conventionally used DPF.

In the figure, the value of an engine PM emission amount schematically calculated as a model value has been set in a PM emission amount model 11 in the form of an estimation map, the value being schematically calculated on the basis of the engine speed, a target fuel injection amount, and the opening degree of a throttle valve of an engine, and also the opening degree of an EGR valve, which controls the amount of EGR, if the engine is an EGR (exhaust gas recirculation) type engine.

Further, the value of a PM regeneration amount in the DPF 1 schematically calculated as a model value on the basis of an actually measured value T1 of the inlet temperature T1 of the DPF 1 and an outlet temperature T2 of the DPF 1 has been set in the PM regeneration amount model 12 in the form of an estimation map.

Then, the PM regeneration amount model 12 is subtracted from the PM emission amount model 11 to determine an estimated PM amount estimation logic 14a.

Meanwhile, the value of an exhaust gas flow rate schematically calculated as a model value has been set in an exhaust gas flow rate model 13 in the form of an estimation map, the value being calculated on the basis of the engine speed, a target fuel injection amount, and the opening degree of a throttle valve of an engine, and also the opening degree of the EGR valve, which controls the amount of EGR, if the engine is the EGR type engine.

Further, as the detection value of a differential pressure of the DPF 1, the differential pressure between the outlet pressure P2 of the DPF 1 and the inlet pressure P1 of the DPF 1 has been calculated as the DPF differential pressure.

Further, the DPF differential pressure schematically calculated as a model value by the exhaust gas flow rate model 13 and the DPF differential pressure is set as a DPF differential pressure model 15 in the form of an estimation map.

Thus, in a PM accumulation amount estimator 17a, the estimated PM accumulation amount, which is the total amount of PM, is determined by the PM accumulation amount estimation logic 14a, which has been estimated, and the DPF differential pressure model 15.

Further, the integrated value of the fuel injection amount calculated on the basis of the engine speed and the target fuel injection amount of the engine, and time by a fuel consumption amount integrating meter 16, is stored in the PM accumulation amount estimator 17a.

As described above, according to the prior art, if the three set estimation elements, namely, the PM accumulation amount estimation logic 14a, the DPF differential pressure model 15, and the fuel consumption amount integrating meter 16, exceed reference upper limit values of accumulation amount, then it means that the PM accumulation amount has reached the limit thereof.

Further, according to the one disclosed in Patent Document 1 (Japanese Patent Application Laid-Open No. 2004-197722), a first PM accumulation amount PM1 is estimated on the basis of a differential pressure before and after a DPF, a PM emission amount is integrated to calculate a second PM accumulation amount PM2, and the PM1 or the PM2, whichever is larger is adopted as the PM accumulation amount which should be the final estimated value.

In the DPF accumulation amount estimating apparatus illustrated in FIG. 7, as described above, the three estimation elements, namely, the set PM accumulation amount estimation logic 14a, the DPF differential pressure model 15, and the fuel consumption amount integrating meter 16, are independently constructed, and if the accumulation amount upper limits on which the aforesaid three elements are based are exceeded, then it means that the PM accumulation amount has reached the limit thereof.

For this reason, if an actual PM emission amount exceeds the aforesaid estimation elements, then the estimated PM amount output by the PM accumulation amount estimation logic 14a will significantly deviate from an actual accumulation amount as time elapses, and present a problem especially if the actual accumulation amount becomes the estimated PM amount or more.

Further, in the DPF accumulation amount estimating apparatus illustrated in FIG. 7, the DPF differential pressure model 15 is considerably influenced by an exhaust gas flow rate, so that the exhaust gas flow rate need to be introduced into an estimation model. However, it is difficult to measure the relationship among the DPF differential pressure, the exhaust gas flow rate, and the PM accumulation amount over the entire engine operation range with high accuracy. Hence, depending on the operating condition of an engine, the estimation accuracy of the DPF differential pressure model 15 may deteriorate.

Especially in the case where the operating condition of an engine significantly changes or in an operating condition of a low load, the PM accumulation amount estimated from the PM accumulation amount estimation logic 14a and the DPF differential pressure model 15 may deviate from an actual accumulation amount.

DISCLOSURE OF INVENTION

In view of the problems with the prior art described above, an object of the present invention is to provide a DPF accumulation amount estimating apparatus which uses an integrated PM accumulation amount estimation logic combining the difference between an engine PM emission amount and a PM regeneration amount and a DPF differential pressure model, thereby achieving improved estimation accuracy with minimized influences of changes in an exhaust gas flow rate and the like.

To this end, according to the present invention, there is provided a DPF accumulation amount estimating apparatus for estimating the accumulation amount in a DPF (diesel particulate filter) provided therewith for removing PM (particulate (particulate matter)) in an exhaust gas, the DPF being installed in an exhaust passage connected to an exhaust port, the DPF accumulation amount estimating apparatus including a PM emission amount model in which a PM emission amount is set on the basis of the operating condition of an engine, a PM regeneration amount model in which a PM regeneration amount is set on the basis of the temperature difference between an outlet temperature and an inlet temperature of the DPF, and a DPF differential pressure model in which a PM accumulation amount is set on the basis of a differential pressure between an exhaust gas flow rate and the DPF, wherein the emission amount from the PM emission amount model, the regeneration amount from the PM regeneration amount model, and a corrected PM accumulation amount, which has been obtained by correcting the estimated value of the PM accumulation amount from the DPF differential pressure model by using a coefficient K determined on the basis of an engine speed and an engine fuel injection amount, are used to calculate an estimated PM accumulation amount of the DPF.

The invention described above is characterized in that the corrected PM accumulation amount is calculated by multiplying the estimation error between the estimated value of the PM accumulation amount from the DPF differential pressure model and the estimated PM accumulation amount by the aforesaid K, and the estimated PM accumulation amount is calculated by adding the corrected PM accumulation amount to the value obtained by subtracting the regeneration amount from the PM regeneration amount model from the emission amount from the PM emission amount model.

Further, the coefficient is preferably set as follows:

(1) The coefficient K is determined such that it increases as an engine speed and the fuel injection amount of the engine increase when the engine speed and the fuel injection amount of the engine are predetermined values or more.

(2) The coefficient K is set to zero when changes in the engine speed and the fuel injection amount of the engine are predetermined values or more, and the estimated value of the PM accumulation amount from the DPF differential pressure model is not corrected.

According to the present invention, the DPF accumulation amount estimating apparatus has a PM emission amount model in which a PM emission amount is set on the basis of the operating condition of an engine, a PM regeneration amount model in which a PM regeneration amount is set on the basis of the temperature difference between an outlet temperature and an inlet temperature of the DPF, and a DPF differential pressure model in which a PM accumulation amount is set on the basis of the differential pressure between an exhaust gas flow rate and the DPF, wherein the emission amount from the PM emission amount model, the regeneration amount from the PM regeneration amount model, and the corrected PM accumulation amount, which has been obtained by correcting the estimated value of the PM accumulation amount from the DPF differential pressure model by using a coefficient K determined on the basis of an engine speed and an engine fuel injection amount are used to calculate an estimated PM accumulation amount of the DPF. Therefore, even if a PM emission amount map and a PM regeneration amount map contain errors, the errors are corrected by an estimated value from the DPF differential pressure model, thus leading to an improved accuracy for estimating the PM accumulation amount.

This arrangement restrains an estimated PM amount from significantly deviating from an actual PM accumulation amount.

Further, the corrected amount of the PM accumulation amount is calculated by multiplying the estimation error between the estimated value of the PM accumulation amount from the DPF differential pressure model and the estimated PM accumulation amount by the aforesaid K, and the estimated PM accumulation amount is calculated by adding the corrected PM accumulation amount to the value obtained by subtracting the regeneration amount from the PM regeneration amount model from the emission amount from the PM emission amount model. Thus, the coefficient K taking into account terms including the engine speed and the fuel injection amount of the engine, which is an exhaust gas flow rate, is used to estimate the PM accumulation amount, so that the influences of the exhaust gas flow rate are reduced with a resultant higher estimation accuracy of the estimated PM accumulation amount.

Further, the coefficient K changes with the engine speed and the fuel injection amount of the engine, and the coefficient K is determined such that it increases as the engine speed and the fuel injection amount of the engine increase if the engine speed and the fuel injection amount of the engine are predetermined values or more. Thus, setting the coefficient K such that it increases with increasing engine speed and fuel injection amount of the engine enhances the correction based on an estimated amount from the DPF differential pressure model in a range wherein the exhaust gas flow rate of the engine increases and the reliability of the DPF differential pressure model is high. The estimated PM accumulation amount based on the operating condition of the engine can be corrected in the enhanced correction environment, resulting in higher estimation accuracy for the estimated PM accumulation amount.

Further, the coefficient K is set to zero when changes in the engine speed and the fuel injection amount of the engine are predetermined values or more, and no correction is carried out on the estimated value of the PM accumulation amount from the DPF differential pressure model. Hence, in the case where changes in the engine speed and the fuel injection amount of the engine are the predetermined values or more, the exhaust gas flow rate also significantly changes, leading to deteriorated reliability of the estimated PM accumulation amount from the DPF differential pressure model. For this reason, the estimation accuracy for the estimated PM accumulation amount is improved by setting the coefficient K to zero so as not to make any correction under such changes.

BEST MODE FOR CARRYING OUT THE INVENTION

The following will explain the present invention in detail by using embodiments illustrated in the accompanying drawings. However, the dimensions, materials, shapes, relative positions and the like of constituent components described in the embodiments are not intended to limit the scope of the present invention thereto, but are merely exemplary unless otherwise specified.

First Embodiment

Figure 1:
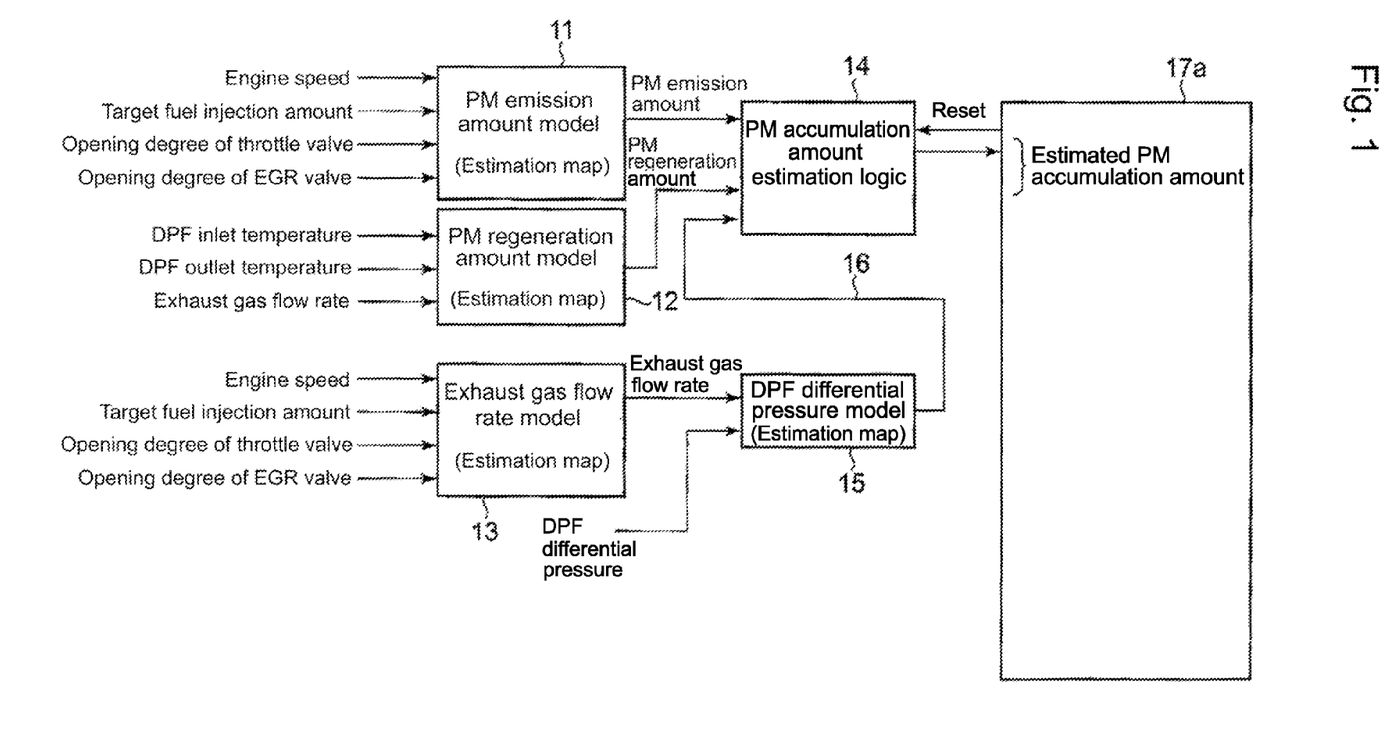
FIG. 1 is a block diagram providing an estimation block diagram of a PM accumulation amount in a regeneration controller of a DPF according to a first embodiment of the present invention.
Figure 2:
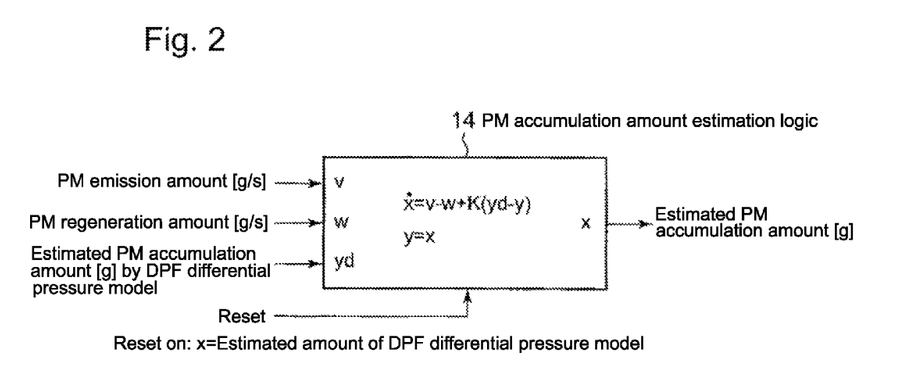
FIG. 2 is an enlarged view of a PM accumulation amount estimation logic in the first embodiment.

FIG. 1 is a block diagram of the estimation of a PM accumulation amount in a regeneration controller of a DPF in accordance with the present invention, and FIG. 2 is an enlarged view of PM accumulation amount estimation logic 14 in FIG. 1. FIG. 6 is a longitudinal sectional diagram of a typical DPF apparatus.

In FIG. 6, reference numeral 13 denotes an exhaust pipe in communication with an exhaust port of an engine (not shown), and reference numeral 50 denotes a DPF apparatus connected to the exhaust pipe 13. The DPF apparatus 50 includes a DPF 1 accommodated in a DPF main unit 2 and a pre-stage oxidation catalyst 3 installed on the upstream side of the DPF 1.

An exhaust gas from the engine passes through an inlet chamber 4 from the exhaust pipe 13 and reaches the pre-stage oxidation catalyst 3 and the exhaust gas is oxidized by the pre-stage oxidation catalyst 3. The oxidative heat generated at that time causes the DPF 1 to rise to 600 to 650° C. in temperature to burn the PM built up in the DPF 1, and the combustion gas is exhausted to the outside through an outlet chamber 5.

Referring to FIG. 6, P1 denotes an inlet pressure of the DPF 1, T1 denotes an inlet temperature of the DPF 1, P2 denotes an outlet pressure of the DPF 1, and T2 denotes an outlet temperature of the DPF 1.

The present invention relates to the estimating apparatus of the PM accumulation amount of the DPF apparatus illustrated in FIG. 6.

In FIG. 1, a value of an engine PM emission amount schematically calculated as a model value on the basis of engine speed, a target fuel injection amount, opening degree of a throttle valve of the engine, and opening degree of an EGR valve, which controls the amount of EGR, if the engine is an EGR (exhaust gas recirculation) type engine, has been set in a PM emission amount model 11 in the form of an estimation map.

Further, a value of a PM regeneration amount in the DPF 1 schematically calculated as a model value on the basis of an actually measured value T1 of the inlet temperature T1 of the DPF 1, an outlet temperature T2 of the DPF 1, and an exhaust gas flow rate has been set in a PM regeneration amount model 12 in the form of an estimation map.

Meanwhile, a value of a exhaust gas flow rate schematically calculated as a model value on the basis of the engine speed, the target fuel injection amount, the opening degree of the throttle valve of the engine, and the opening degree of the EGR valve if the engine is the EGR type engine, has been set in an exhaust gas flow rate model 13 in the form of an estimation map.

Further, as a detection value of differential pressure of the DPF 1, the differential pressure between the outlet pressure P2 of the DPF 1 and the inlet pressure P1 of the DPF 1 (refer to FIG. 6) has been calculated as a DPF differential pressure.

Further, the DPF differential pressure schematically calculated as a model value by the exhaust gas flow rate model 13 and the DPF differential pressure is set as a DPF differential pressure model 15 in the form of an estimation map.

Further, in FIG. 2, a PM emission amount v from the PM emission amount model 11, a PM regeneration amount w from the PM regeneration amount model 12, and an estimated PM accumulation amount yd from the DPF differential pressure model 15 are input to the PM accumulation amount estimation logic 14.

In the PM accumulation amount estimation logic 14;

$$dx/dt = v - w + K(yd - y)$$

$$y = x$$

where x denotes the estimated value of the PM accumulation amount.

Then, this x is replaced by y to calculate the estimated PM accumulation amount (g).

Here, the coefficient K is a coefficient determined on the basis of an engine speed and a fuel injection amount of an engine, and K(yd−y), which is the corrected PM accumulation amount which has been corrected using the coefficient K, is calculated.

The (yd−y) denotes an estimation error between the estimated PM accumulation amount yd and an estimated PM accumulation amount y from the DPF differential pressure model 15, and the error difference is multiplied by the coefficient K to calculate the corrected PM accumulation amount.

If the engine speed and the fuel injection amount of the engine exceed predetermined values, then the corrected PM accumulation amount is calculated by multiplying the estimated error between the estimated value of the PM accumulation amount and the estimated PM accumulation amount from the DPF differential pressure model by the aforesaid K, and the estimated PM accumulation amount is calculated by adding the corrected PM accumulation amount to the value obtained by subtracting the regeneration amount from the PM regeneration amount model from the emission amount from the PM emission amount model.

Thus, the coefficient K taking into account terms including the engine speed and the fuel injection amount of the engine, which is an exhaust gas flow rate, is used to estimate the PM accumulation amount, so that the influences of an exhaust gas flow rate are reduced, leading to a resultant higher estimation accuracy of the estimated PM accumulation amount.

Figure 4:
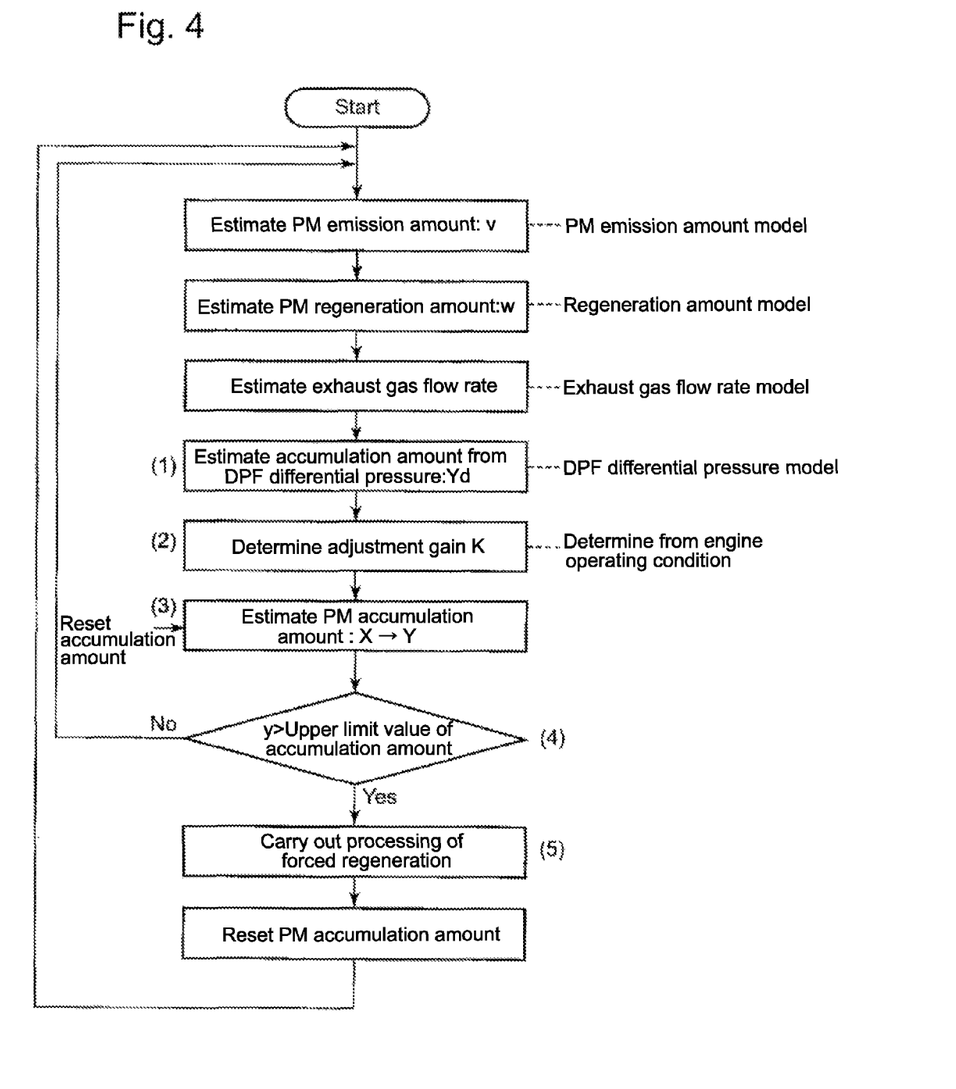
FIG. 4 is a control flowchart of an estimating apparatus of a PM accumulation amount in the first embodiment.

FIG. 4 is a control flowchart of the estimating apparatus of the PM accumulation amount which is constructed as described above.

In FIG. 4, the accumulation amount yd from a DPF differential pressure is estimated by the PM emission amount model 11, the PM regeneration amount model 12, the exhaust gas flow rate and the like (step (1)), and an adjustment gain (coefficient) K is determined by the aforesaid means (step (2)).

Subsequently, the PM accumulation amount is estimated (x→y) (step (3)) and if the PM accumulation amount exceeds an upper limit value of the accumulation amount (step (4)), then the DPF 1 is forcibly regenerated (step (5)).

Second Embodiment

Figure 3:
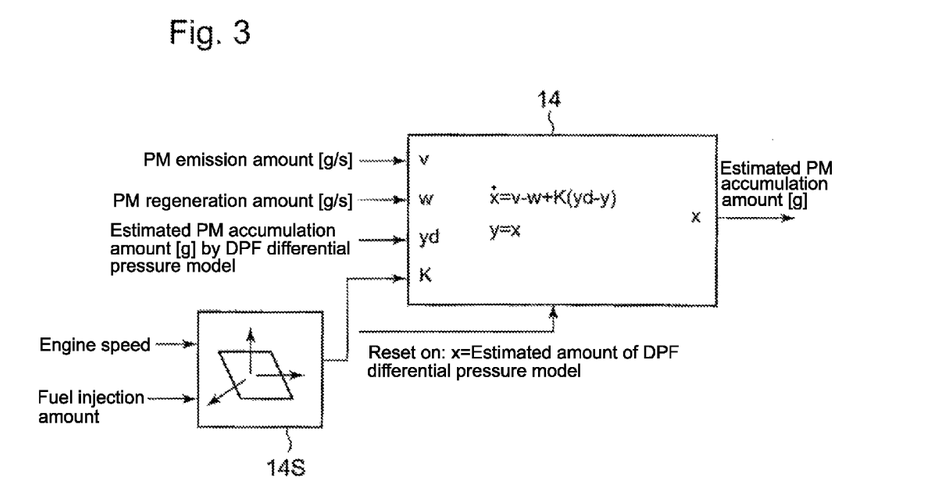
FIG. 3 is an enlarged view of a PM accumulation amount estimation logic in a second embodiment of the present invention.

FIG. 3 is a block diagram illustrating a second embodiment of a PM accumulation amount estimation logic in a regeneration controller of a DPF according to the second embodiment of the present invention.

Figure 5:
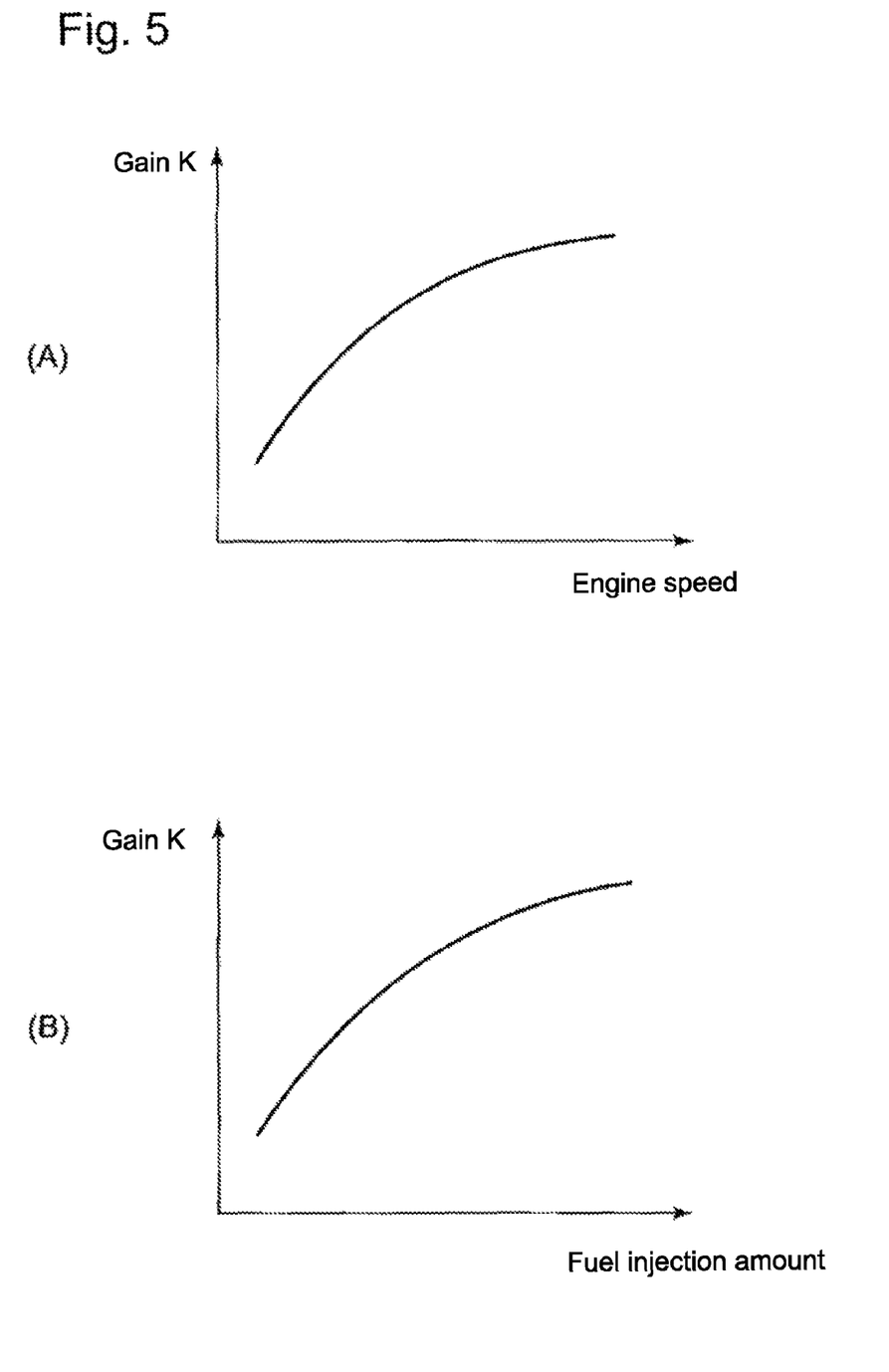
FIGS. 5(A) and 5(B) present charts of a coefficient K in the first embodiment.

In the second embodiment, as illustrated in FIGS. 5(A) and (B), the aforesaid K is determined such that it changes according to the engine speed and the fuel injection amount of the engine (14s in FIG. 3), increases with the engine speed, as illustrated in FIG. 5(A), and increases as the fuel injection amount of the engine increases, as illustrated in FIG. 5(B).

With this arrangement, the coefficient K increases as the engine speed and the fuel injection amount of the engine increase, and the estimated PM accumulation amount is increased as the exhaust gas flow rate of the engine increases, thus making it possible to correct the estimated PM accumulation amount according to the operating condition of the engine. The result is an improved estimation accuracy of the estimated PM accumulation amount.

Further, in the case where changes in the engine speed and the fuel injection amount of the engine are predetermined values or more, changes in an exhaust gas flow rate are large accordingly, leading to deteriorated reliability of the estimated PM accumulation amount from the DPF differential pressure model. For this reason, under such changes, the coefficient K is set to zero so as not to make any correction, thereby improving the estimation accuracy of the estimated PM accumulation amount.

Thus, according to the first and the second embodiments, the PM accumulation amount is estimated in a hybrid manner on the basis of the PM emission amount from the PM emission amount model 11 in which the PM emission amount is set according to the operating condition of the engine, the temperature difference between the outlet temperature and the inlet temperature of the DPF, the PM regeneration amount from the PM regeneration amount model 12 in which the PM regeneration amount is set according to an exhaust gas flow rate, and a corrected PM accumulation amount obtained by correcting an estimated value from the DPF differential pressure model 15 by using the coefficient K determined on the basis of the engine speed and the fuel injection amount of the engine. Hence, even if the PM emission amount map 11 and the PM regeneration amount map 12 contain errors, the errors are corrected by an estimated value from the DPF differential pressure model, thus leading to an improved accuracy for estimating the PM accumulation amount.

This arrangement restrains an estimated PM accumulation amount from significantly deviating from an actual PM accumulation amount.

INDUSTRIAL APPLICABILITY

According to the present invention, it is possible to provide a DPF accumulation amount estimating apparatus with an improved estimation accuracy which minimizes influences of changes in an exhaust gas flow rate and the like by using an integrated PM accumulation amount estimation logic which combines the difference between an engine PM emission amount and a PM regeneration amount and a DPF differential pressure model.

The invention claimed is:

1. A DPF accumulation amount estimating apparatus which estimates an accumulation amount in a DPF (diesel particulate filter) provided therewith for removing PM (particulates (particulate matters)) in an exhaust gas, the DPF being installed in an exhaust passage connected to an exhaust port, the DPF accumulation amount estimating apparatus comprising: a PM emission amount model in which a PM emission amount is set on the basis of an operating condition of an engine; a PM regeneration amount model in which a PM regeneration amount is set on the basis of the temperature difference between an outlet temperature and an inlet temperature of the DPF; and a DPF differential pressure model in which a PM accumulation amount is set on the basis of a differential pressure between an exhaust gas flow rate and the DPF, wherein the emission amount from the PM emission amount model, the regeneration amount from the PM regeneration amount model, and a corrected PM accumulation amount, which has been obtained by correcting the estimated value of the PM accumulation amount from the DPF differential pressure model by using a coefficient K determined on the basis of an engine speed and an engine fuel injection amount, are used to calculate an estimated PM accumulation amount of the DPF.

2. The DPF accumulation amount estimating apparatus according to claim 1, wherein the corrected PM accumulation amount is calculated by multiplying the estimation error between the estimated value of the PM accumulation amount from the DPF differential pressure model and the estimated PM accumulation amount by the K, and the estimated PM accumulation amount is calculated by adding the corrected PM accumulation amount to a value obtained by subtracting a regeneration amount from the PM regeneration amount model from an emission amount from the PM emission amount model.

3. The DPF accumulation amount estimating apparatus according to claim 1, wherein the coefficient K is determined such that the coefficient K increases as the engine speed and the fuel injection amount of the engine increase in the case where the engine speed and the fuel injection amount of the engine are predetermined values or more.

4. The DPF accumulation amount estimating apparatus according to claim 1, wherein the coefficient K is set to zero in the case where changes in the engine speed and the fuel injection amount of the engine are predetermined values or more, and the estimated value of the PM accumulation amount from the DPF differential pressure model is not corrected.

* * * * *